F. MEYROSE.
Candle Mold.
No. 29,506.  Patented Aug. 7, 1860.
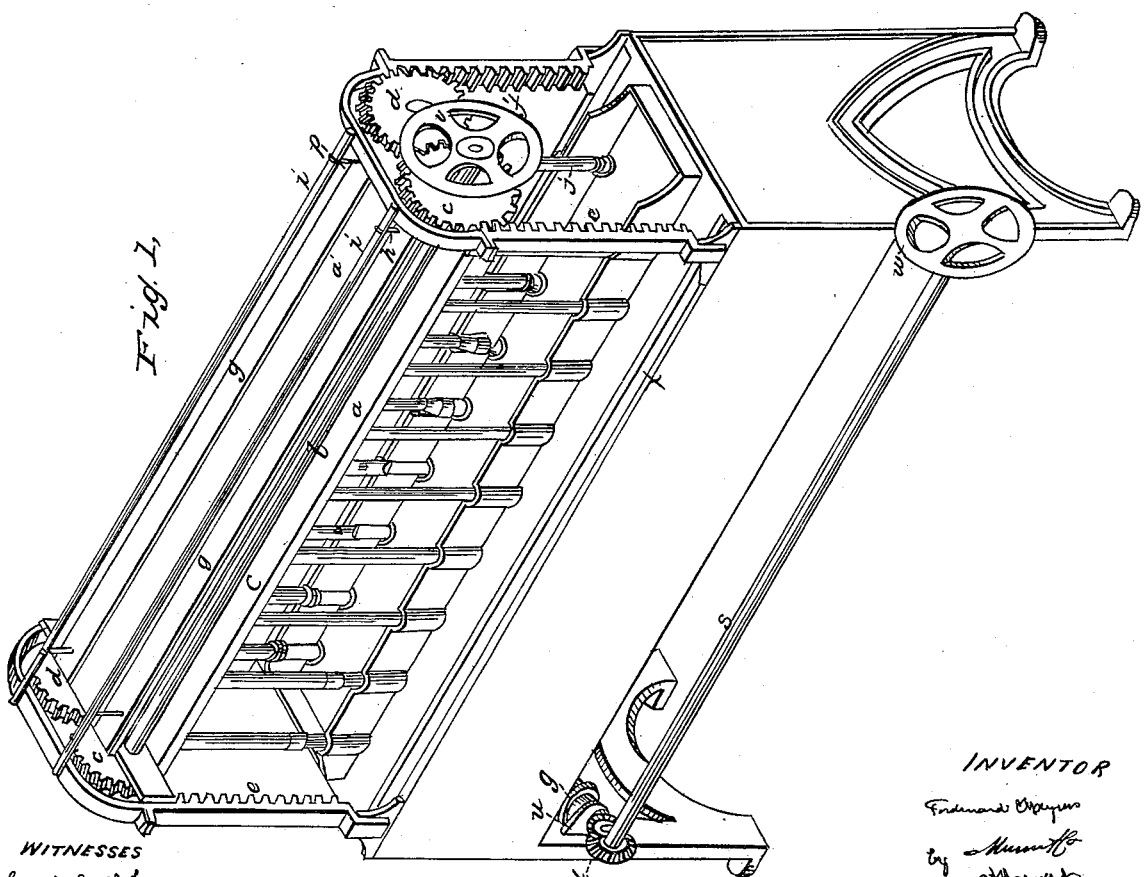

UNITED STATES PATENT OFFICE.

FERDENAND MEYROSE, OF ST. LOUIS, MISSOURI.

MACHINERY FOR MOLDING CANDLES.

Specification of Letters Patent No. 29,506, dated August 7, 1860.

*To all whom it may concern:*

Be it known that I, F. MEYROSE, of St. Louis, State of Missouri, have invented a new and useful Improvement in Molding Candles; and I do hereby declare the following to be a full, clear, and exact description of the same, reference being had to the accompanying drawings, which form a part of this specification, in which—

Figure 1, represents a perspective view, and Fig. 2, a vertical cross section of the machine.

Similar letters of reference in each of the several figures indicate corresponding parts.

The nature of my invention consists in, first, the combination of candle molds $k$, and hollow pistons $j$, which latter have a reciprocating motion and serve the double purpose of guiding the wick $h$, (passing through the center hole of each piston) and of pushing the candles when finished out of the molds; second, the combination of candle molds $k$, open at the bottom with two frames $l$, $m$, and $l'$, $m'$, and two pairs of cams $p$, $q$, and $p'$, $q'$, or their equivalents for the double purpose of clamping the wick between the two frames while the candles are being cast, and of opening the frames wide enough when the candles are finished and allowing them to be pushed down through the opening in the bottom of the molds and between the said frames.

To enable others skilled in the art to make and use my invention, I will proceed to describe its construction and operation.

A series of candle molds $k$, open at top and bottom are arranged in a box $x$, which forms part of the main frame of this machine. This box may be kept filled with cold water while the candles are being cast.

A series of hollow pistons $j$ (one piston to each mold) are arranged in line with the molds and are fastened to a plate $a$, at their upper ends. The plate $a$, is provided with a vertical flange $y$, at each end, these flanges forming the bearings for the shaft $b$, of cog wheels $c$, $c$, and for the pivots of cog wheels $d$, $d$. One pair $c$, $d$, of these cog wheels, are arranged at each end of the machine, and gear into each other while they also gear into a rack frame $e$, $f$. On revolving the shaft $b$, by means of hand wheel $v$, both pairs of cog wheels will be made to turn and (as their cogs take into the cogs of racks $e$, $f$,) will ascend or descend together, with the frame $y$, $a$, and with the pistons $j$.

The wicks $h$, which are wound around spools $i$, on top of the machine, pass through holes in strips $g$, of india rubber or other suitable material, and through holes in a plate $a'$, (which plate is fastened to the flanges $y$, and serves as a support for the strips $g$,) and through the hollow pistons $j$, and through the center of the molds $k$.

Two frames $l$, $m$, $l'$, $m'$, (hereafter to be described) clamp the lower ends of the wicks. The wicks being held at the bottom by the frames $l$, $m$, $l'$, $m'$, and at the top by the friction in the holes of strips $g$, and being also guided by the hollow pistons $j$, will thus always be kept straight and in the center of the molds. The frame $l$, $m$, consists of two longitudinal bars $l$, and $m$, connected by cross bars $n$, while the frame $l'$ $m'$, consists of two similar longitudinal bars $l'$ and $m'$, connected by cross bars $o$. The frames $l$, $m$, and $l'$, $m'$, can be moved laterally apart or together in the following manner: Each end of the bar $l$, of frame $l$, $m$, is held between the parallel cams or portions of screw threads $p$, $q$, upon a lateral shaft $r$, and each end of bar $m'$, of frame $l'$, $m'$, is held in similar manner between two parallel cams or portions of screw threads $p'$, $q'$, also upon shaft $r$. The windings of two sets of cams or screw threads $p$, $q$, and $p'$, $q'$, are in directions opposite to each other, similar to left and right hand screws. The shafts $r$ have their bearings in the main frame of the machine and their outer ends are provided with bevel wheels $u$, which take into bevel wheels $t$, upon a longitudinal shaft $s$. By revolving the shaft $s$, (by means of hand wheel $w$,) the lateral shafts $r$, and cams $p$, $q$, and $p'$, $q'$, will be made to revolve. As the cams are turned one way or the other the frames $l$, $m$, and $l'$, $m'$, will be operated, so as to move the bars $l$, and $m$, toward or from the bars $l'$, and $m'$, respectively.

When the candles are to be cast the frames $l$, $m$, and $l'$, $m'$, are moved together (by operating the cams) so as to clamp the ends of the wicks between the bars $l$, $l'$, and $m$, $m'$, so as to hold the wicks firmly in their central positions while the candles are being cast. When the candles are finished the said frames are moved apart (by operating the cams) wide enough to let the candles pass between. The candles are pushed down through the molds by means of the pistons $j$, which are caused to move down together with the frame $a$, $y$, $a'$, $g$, by working the shaft $b$, and cogs $c$, $d$, as above described. After the candles have been pushed through, and the wicks cut below the frames $l$, $m$, $l'$, $m'$, these frames are again closed so as to clamp the new ends of the wicks, and the pistons are moved upward into their original position when the machine is again ready for casting candles.

What I claim as my invention, and desire to secure by Letters Patent, is—

1. The combination of candle molds $k$, and hollow pistons $j$, which latter have a reciprocating motion, and serve the double purpose of guiding the wick $h$, and of pushing the candles when finished out of the molds, substantially as and for the purposes set forth.

2. The combination of candle molds $k$, open at the bottom with two frames $l$, $m$, $l'$, $m'$, and two pairs of cams $p$, $q$, $p'$, $q'$, or their equivalents, for the double purpose of clamping the wicks, between the two frames while the candles are being cast, and of opening the frames wide enough when the candles are finished, and allowing them to be pushed down through the opening at the bottom of the molds and between the said frames, substantially as and for, the purposes set forth.

FERDENAND MEYROSE.

Witnesses:
JULIUS F. SCHNEIDER,
G. H. TIMMERMAN.